United States Patent
Dorsey et al.

(10) Patent No.: US 12,147,839 B2
(45) Date of Patent: Nov. 19, 2024

(54) CPU CLUSTER SHARED RESOURCE MANAGEMENT

(71) Applicant: Apple Inc., Cupertino, CA (US)

(72) Inventors: John G. Dorsey, San Francisco, CA (US); Bryan R. Hinch, Campbell, CA (US); Ronit Banerjee, Cupertino, CA (US); Kushal Dalmia, Santa Clara, CA (US); Daniel A. Chimene, San Francisco, CA (US); Jaidev P. Patwardhan, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/392,929

(22) Filed: Aug. 3, 2021

(65) Prior Publication Data

US 2023/0040310 A1 Feb. 9, 2023

(51) Int. Cl.
*G06F 9/50* (2006.01)
*G06F 9/48* (2006.01)
*G06F 11/14* (2006.01)

(52) U.S. Cl.
CPC .......... *G06F 9/5044* (2013.01); *G06F 9/4881* (2013.01); *G06F 9/5088* (2013.01); *G06F 9/4887* (2013.01); *G06F 11/141* (2013.01); *G06F 2209/501* (2013.01); *G06F 2209/5018* (2013.01); *G06F 2209/505* (2013.01)

(58) Field of Classification Search
None
See application file for complete search history.

(56) References Cited

U.S. PATENT DOCUMENTS

| | | | | |
|---|---|---|---|---|
| 5,898,815 A | * | 4/1999 | Bluhm | G06F 13/4226 710/45 |
| 8,028,286 B2 | * | 9/2011 | Fedorova | G06F 9/4881 718/107 |
| 8,315,473 B1 | * | 11/2012 | Tao | G06T 5/20 382/168 |
| 9,684,461 B1 | * | 6/2017 | Dodson | G06F 13/1668 |
| 9,898,347 B1 | * | 2/2018 | Gupta | G06F 9/5027 |
| 10,599,481 B2 | | 3/2020 | Pistol et al. | |

(Continued)

OTHER PUBLICATIONS

Mogul et al, Eliminating Receive Livelock in an Interrupt-Driven Kernel, Jan. 1996, pp. 1-17 (Year: 1996).*

*Primary Examiner* — Abu Zar Ghaffari
(74) *Attorney, Agent, or Firm* — Sterne, Kessler, Goldstein & Fox P.L.L.C.

(57) ABSTRACT

Embodiments include an asymmetric multiprocessing (AMP) system having a first central processing unit (CPU) cluster comprising a first core type, and a second CPU cluster comprising a second core type, where the AMP system can update a thread metric for a first thread running on the first CPU cluster based at least on: a past shared resource overloaded metric of the first CPU cluster, and on-core metrics of the first thread. The on-core metrics can indicate that first thread contributes to contention of the same shared resource corresponding to the past shared resource overloaded metric of the first CPU cluster. The AMP system can assign the first thread to a different CPU cluster while other threads of the same thread group remain assigned to the first CPU cluster. The thread metric can include a Matrix Extension (MX) thread flag or a Bus Interface Unit (BIU) thread flag.

18 Claims, 11 Drawing Sheets

(56) References Cited

U.S. PATENT DOCUMENTS

| | | | |
|---|---|---|---|
| 10,999,766 B2* | 5/2021 | He | H04W 28/0838 |
| 2003/0088740 A1* | 5/2003 | Henry | G06F 12/0862 |
| | | | 712/E9.055 |
| 2003/0105933 A1* | 6/2003 | Keskar | G06F 13/1694 |
| | | | 711/167 |
| 2007/0061521 A1* | 3/2007 | Kelly | G06F 9/544 |
| | | | 711/147 |
| 2007/0150657 A1* | 6/2007 | Yigzaw | G06F 12/0842 |
| | | | 711/E12.039 |
| 2009/0037658 A1* | 2/2009 | Sistla | G06F 12/084 |
| | | | 711/119 |
| 2009/0187909 A1* | 7/2009 | Russell | G06F 9/5094 |
| | | | 718/102 |
| 2010/0149201 A1* | 6/2010 | Guarnieri | G06K 15/02 |
| | | | 345/556 |
| 2011/0055838 A1* | 3/2011 | Moyes | G06F 9/4881 |
| | | | 718/102 |
| 2011/0179422 A1* | 7/2011 | Stegaru | G06F 11/3006 |
| | | | 718/104 |
| 2011/0191776 A1* | 8/2011 | Bose | G06F 9/46 |
| | | | 718/102 |
| 2012/0096153 A1* | 4/2012 | Weiser | H04L 43/0876 |
| | | | 709/224 |
| 2013/0198755 A1* | 8/2013 | Kim | G06F 9/505 |
| | | | 718/104 |
| 2014/0089936 A1* | 3/2014 | Chang | G06F 9/505 |
| | | | 718/105 |
| 2014/0143788 A1* | 5/2014 | Kurihara | G06F 9/5016 |
| | | | 718/104 |
| 2016/0092363 A1* | 3/2016 | Wang | G06F 1/3206 |
| | | | 711/119 |
| 2016/0098229 A1* | 4/2016 | Schreiber | G06F 3/0673 |
| | | | 711/166 |
| 2016/0179560 A1* | 6/2016 | Ganguli | G06F 9/5072 |
| | | | 718/1 |
| 2017/0235606 A1* | 8/2017 | Cherniavsky | G06F 9/5011 |
| | | | 718/104 |
| 2018/0024860 A1* | 1/2018 | Balle | G11C 11/56 |
| | | | 718/104 |
| 2018/0052709 A1* | 2/2018 | Fong | G06F 9/5044 |
| 2020/0019485 A1* | 1/2020 | Moradi | G06F 9/44505 |
| 2021/0200656 A1* | 7/2021 | Weissmann | G06F 9/5077 |
| 2021/0311852 A1* | 10/2021 | Doddaiah | G06F 11/3485 |
| 2023/0325241 A1* | 10/2023 | Herdrich | G06F 9/5016 |
| | | | 718/104 |

* cited by examiner

CPU CLUSTER SHARED RESOURCE MANAGEMENT

BACKGROUND

Field

The embodiments relate generally to central processing unit (CPU) clusters and management of shared resources in a computing device.

Related Art

More specifically, the embodiments relate to processes in an operating system of a computing device that can manage thread groups that run on central processing unit (CPU) clusters that include shared resources.

SUMMARY

Some embodiments include a system, apparatus, method, and computer program product for managing shared resources of a central processing unit (CPU) cluster. Some embodiments include for example, a method performed on a computing system that includes a first central processing unit (CPU) cluster of a first core type and a second CPU cluster of a second core type. The first core type can be a performance (P)-core, and the second core type can be an efficiency (E)-core. The method can include updating a thread metric for a first thread running on the first CPU cluster based at least on a past shared resource overloaded metric of the first CPU cluster and an on-core metric of the first thread. The on-core metric of the first thread can indicate that first thread uses a shared resource that corresponds to the past shared resource overloaded metric of the first CPU cluster. Based on the updated thread metric, the method can assign the first thread to a different CPU cluster of the first core type. The thread metric for the first thread can include a Matrix Extension (MX) thread flag or a Bus Interface Unit (BIU) thread flag. In some embodiments, the first thread is part of a thread group, and a second thread of the thread group remains assigned to the first CPU cluster.

The updating can occur during a callout function, whereas the past shared resource overloaded metric of the first CPU cluster can be measured in a sample interval prior to the callout function. To determine the shared resource overloaded metric of the first CPU cluster, the method can include assessing during a sample interval, performance counters of the first CPU cluster, and based on the assessing, determine that a shared resource of the first CPU cluster is overloaded. Based at least on the determining of the shared resource being overloaded, some embodiments include setting a shared resource overload flag of the first CPU cluster, where the shared resource overload flag comprises a single bit.

BRIEF DESCRIPTION OF THE FIGURES

The accompanying drawings, which are incorporated herein and form part of the specification, illustrate the presented disclosure and, together with the description, further serve to explain the principles of the disclosure and enable a person of skill in the relevant art(s) to make and use the disclosure.

Figure 1:
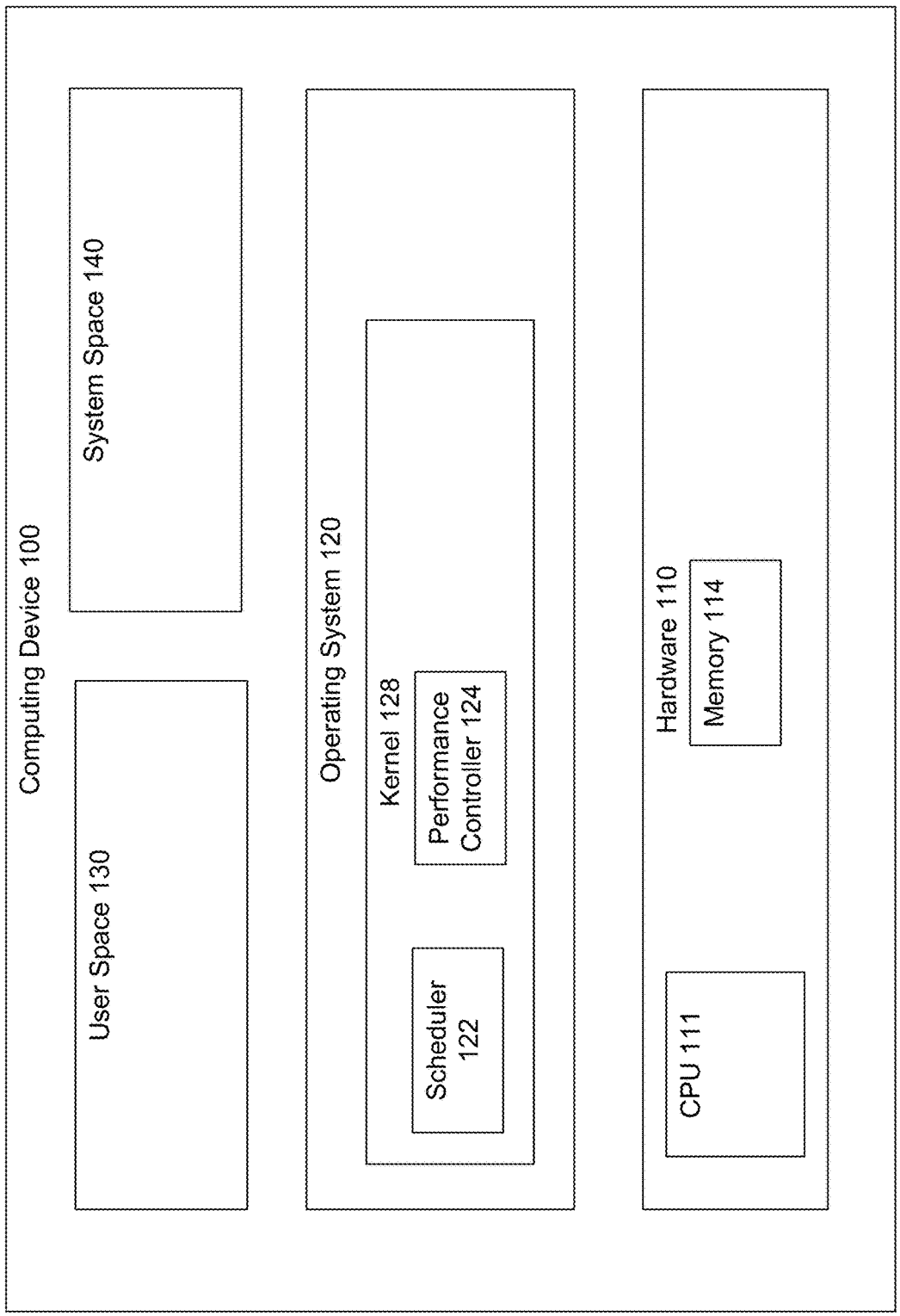
FIG. 1 illustrates an example system with central processing unit (CPU) cluster shared resource management, in accordance with some embodiments of the disclosure.

The presented disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some embodiments include a system, apparatus, method, and computer program product for managing shared resources of a central processing unit (CPU) cluster. Some embodiments include utilizing historical metrics collected at a microarchitectural level of a CPU cluster to determine whether a resource that is shared among CPU cores of the CPU cluster has experienced an overload. Examples of a shared resource on a CPU cluster includes a matrix extension (MX) engine, a bus interface unit (BIU), and a last level cache (LLC). During a scheduler callout, some embodiments utilize the historical overload metrics of the CPU cluster to determine whether on-core thread metrics for a present thread should be collected and analyzed to determine if the present thread may contribute to usage of a shared resource corresponding to the historical overload metrics. When a determination is made that the present thread may contributed to usage of the shared resource corresponding to the historical overload metrics for the CPU cluster, a thread flag corresponding to the type of shared resource (e.g., MX, BIU, LLC) can be set for the present thread. Subsequently, the thread flag can be used to guide the present thread to a different CPU cluster to take advantage of the shared resources on the different CPU cluster, as well as alleviate shared resource overloads on the previous CPU cluster.

A computing device can include a central processing unit (CPU) that includes two or more CPU clusters. A CPU cluster can be a collection of CPU cores that share some common resources such as a cache or a matrix arithmetic unit. Assigning workloads (e.g., threads of a thread group) to a same CPU cluster that shares resources and information can yield performance advantages. In some cases however, assigning workloads to a same CPU cluster can be inefficient. For example, an interface between a CPU cluster and fabric can become a bottle neck, or a coprocessor supporting accelerated integer and floating-point arithmetic can become oversubscribed. Some embodiments enable work loads to be distributed across multiple CPU clusters. In particular, embodiments enable one or more individual threads of a thread group to be assigned from a first CPU cluster to a second CPU cluster based on historical microarchitectural information collected from performance counters of the first CPU cluster, as well as on-core data corresponding to the one or more individual threads. Remaining threads of the thread group may continue to be assigned to the first CPU cluster.

FIG. 1 illustrates example system 100 with central processing unit (CPU) cluster shared resource management, in accordance with some embodiments of the disclosure. System 100 can be a computing device including but not limited to a computer, laptop, mobile phone, tablet, and personal digital assistant. System 100 can be computing device 100 that includes hardware 110, operating system 120, user space 130, and system space 140. Hardware 110 can include CPU 111 that can include a plurality of CPU clusters, where each CPU cluster includes up to 4 independent processing units called CPU cores. When the plurality of CPU clusters include CPU cores of a same CPU core type, CPU 111 can be considered a symmetric multiprocessing system (SMP). When at least one CPU cluster of the plurality of CPU clusters include CPU cores of a different type, CPU 111 is considered an asymmetric multiprocessing system (AMP). Core types can include performance cores (P-core), efficiency cores (E-core), graphics cores, digital signal processing cores, and arithmetic processing cores. A P-core can have an architecture that is designed for very high throughput and may include specialized processing such as pipelined architecture, floating point arithmetic functionality, graphics processing, or digital signal processing. A performance core may consume more energy per instruction than an efficiency core. An efficient core may consume less energy per instruction than a performance core.

Memory 114 can be any type of memory including dynamic random-access memory (DRAM), static RAM, read-only memory (ROM), flash memory, or other memory device. Storage can include hard drive(s), solid state disk(s), flash memory, USB drive(s), network attached storage, cloud storage, or other storage medium. In an embodiment, CPU 111 can comprise a system on a chip (SoC) that may include other hardware elements of hardware 110.

Operating system 120 can include a kernel 128, scheduler 122, and performance controller 124 as well as operating system services (not shown.) Scheduler 122 can include interfaces to CPU 111, and can include thread group logic that enables performance controller 124 to measure, track, and control performance of threads by thread groups. Performance controller 124 manages execution efficiency by understanding the performance needs of software workloads and configuring performance features of CPU 111 to meet those needs. Performance controller 124 can include logic to receive sample metrics from scheduler 122, process the sample metrics per thread group, and determine a control effort needed to meet performance targets for the threads in the thread group. The sample metrics may be processed on the order of milliseconds (e.g., 2 msec, 4 msec.) Performance controller can recommend a core type (e.g., P-type, E-type) and dynamic voltage and frequency scaling (DVFS) state for processing threads of the thread group.

User space 130 can include one or more application programs and one or more work interval object(s). System space 140 can include processes such a launch daemon and other daemons not shown (e.g. media service daemon and animation daemon.) Communications can occur between kernel 128, user space 130 processes, and system space 140 processes.

Figure 2A:
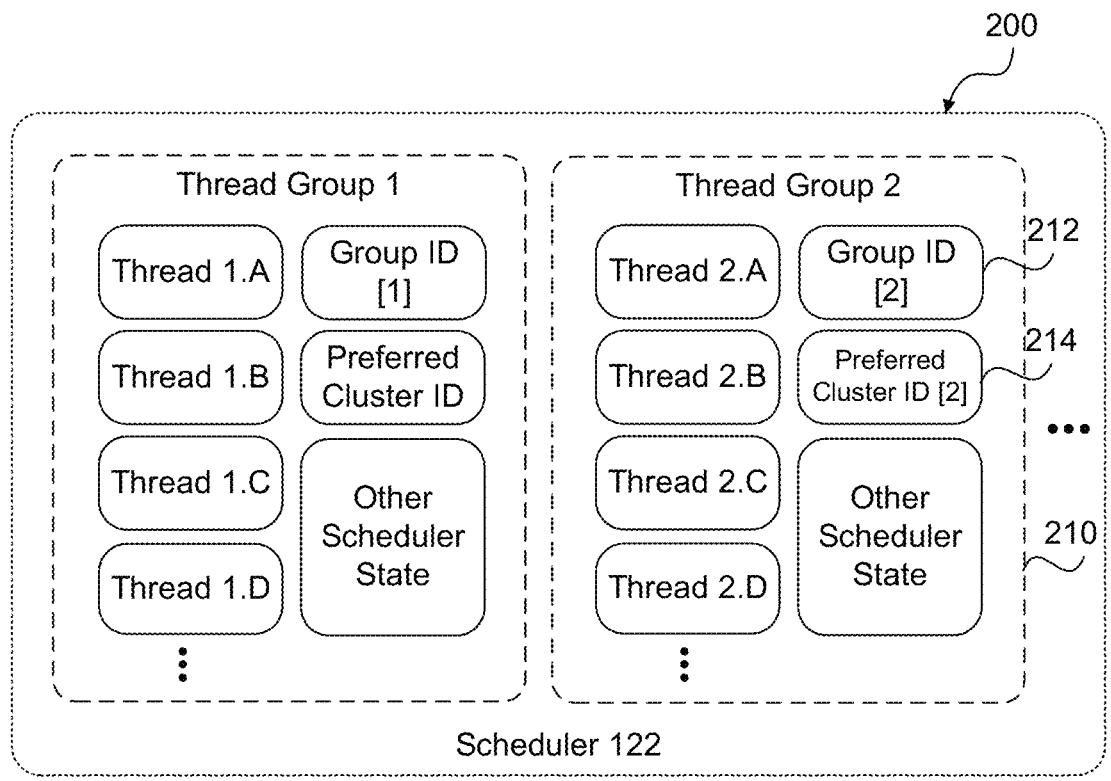
FIGS. 2A and 2B illustrate an example of updating a thread group's preferred CPU cluster, according to some embodiments of the disclosure.
Figure 2B:
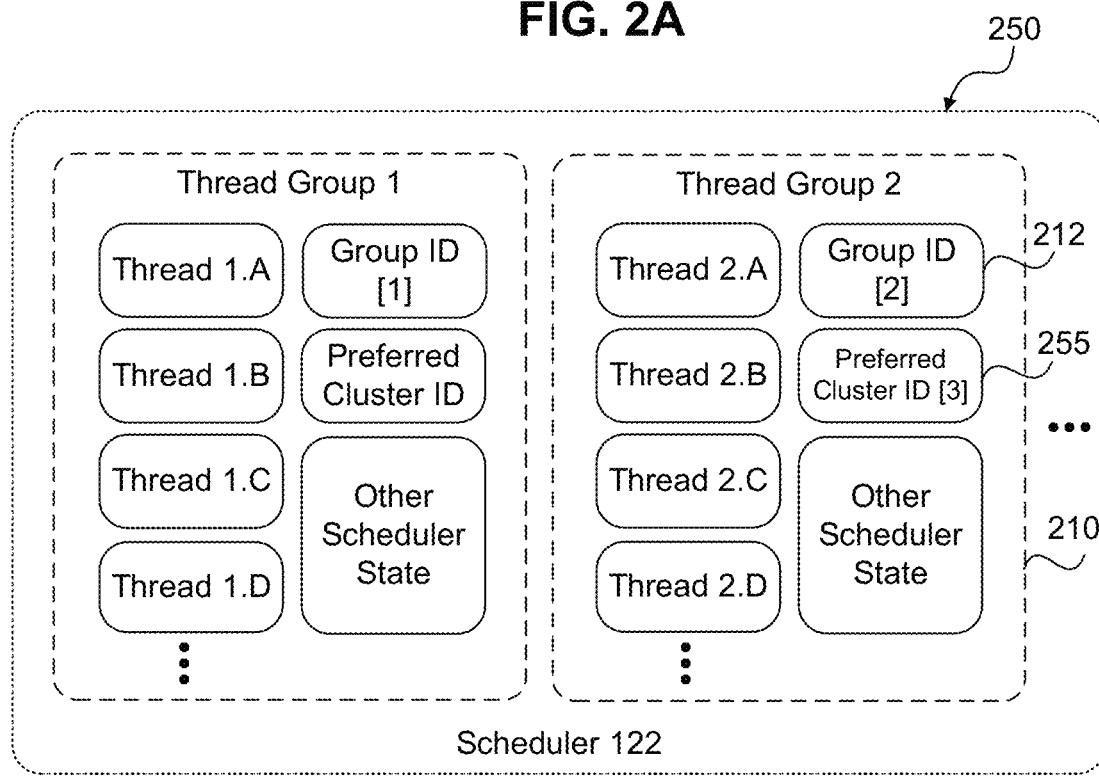

FIGS. 2A and 2B include examples 200 and 250 illustrating updating a thread group's preferred CPU cluster, according to some embodiments of the disclosure. As a convenience and not a limitation, FIGS. 2A-2B may be described with reference to elements from other figures in the disclosure. For example, examples 200 and 250 can refer to scheduler 122 as well as performance controller 124 of FIG. 1. Performance controller 124 can communicate information to scheduler 122 to affect changes on a thread group basis. For example, performance controller 124 can assess metrics based on higher layer concepts including, but not limited to: How much time a workload (e.g., thread group) spends on a CPU cluster, or whether the workload is meeting the timing metrics (e.g., deadlines.) Based on the higher layer concepts, performance controller 124 can recommend for example, that a thread group be moved from one CPU cluster to another CPU Cluster. Example 200 illustrates scheduler 122 that includes two thread groups. Thread group 2 210, identified by Group ID 212 of value 2, includes a plurality of threads 2.A, 2.B, 2.C, 2.D and so on. Thread group 2 210 is currently assigned to CPU cluster 2 as shown in preferred cluster ID 214. Performance controller 124 can update a thread group's preferred CPU cluster by transmitting a message to scheduler 122. For example, performance controller 124 can indicate to scheduler 122 that thread group 2 should move to CPU cluster 3 by transmitting a message to the scheduler (e.g., Group ID [2]→Cluster 3) indicating that the thread group with the Group ID [2], thread group 2 212 should change the preferred cluster ID 255 to CPU cluster 3. Example 250 illustrates that scheduler 122 has received the message from performance controller 124 and has made the update as recommended. Thus, preferred cluster ID 255 has a value of 3, corresponding to CPU cluster 3 and thread group 2 212 are scheduled to run on CPU cluster 3 instead of CPU cluster 2.

Figure 3A:
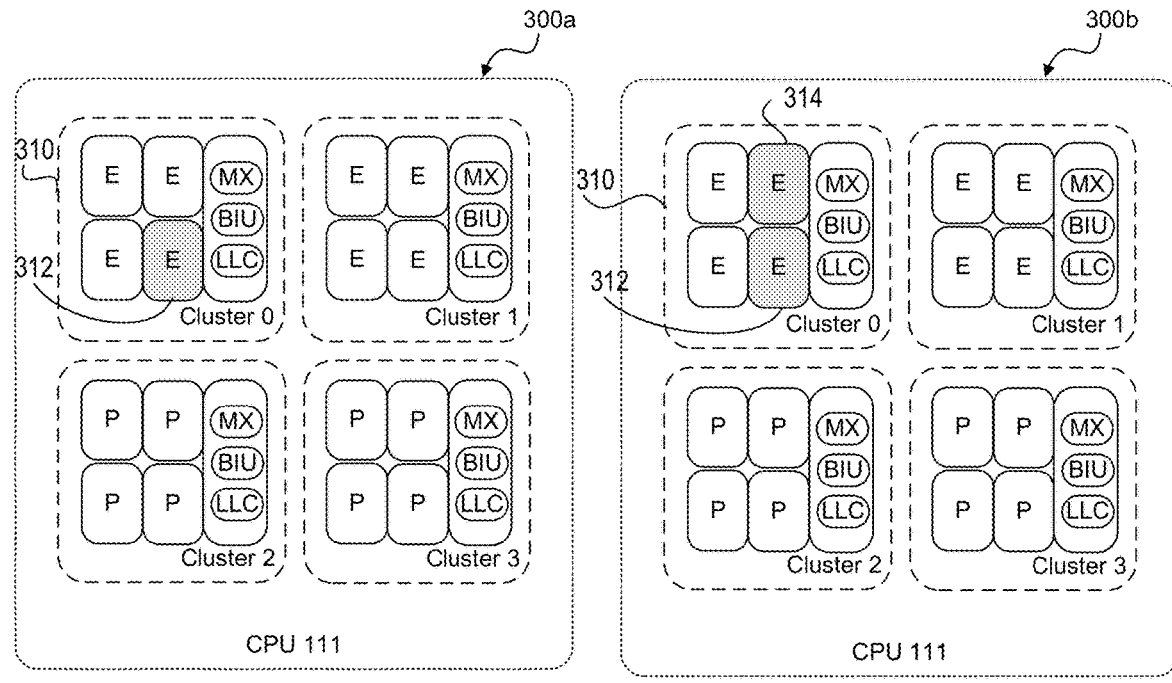
FIG. 3A illustrates an example of thread group placement, according to some embodiments of the disclosure.
Figure 3A:
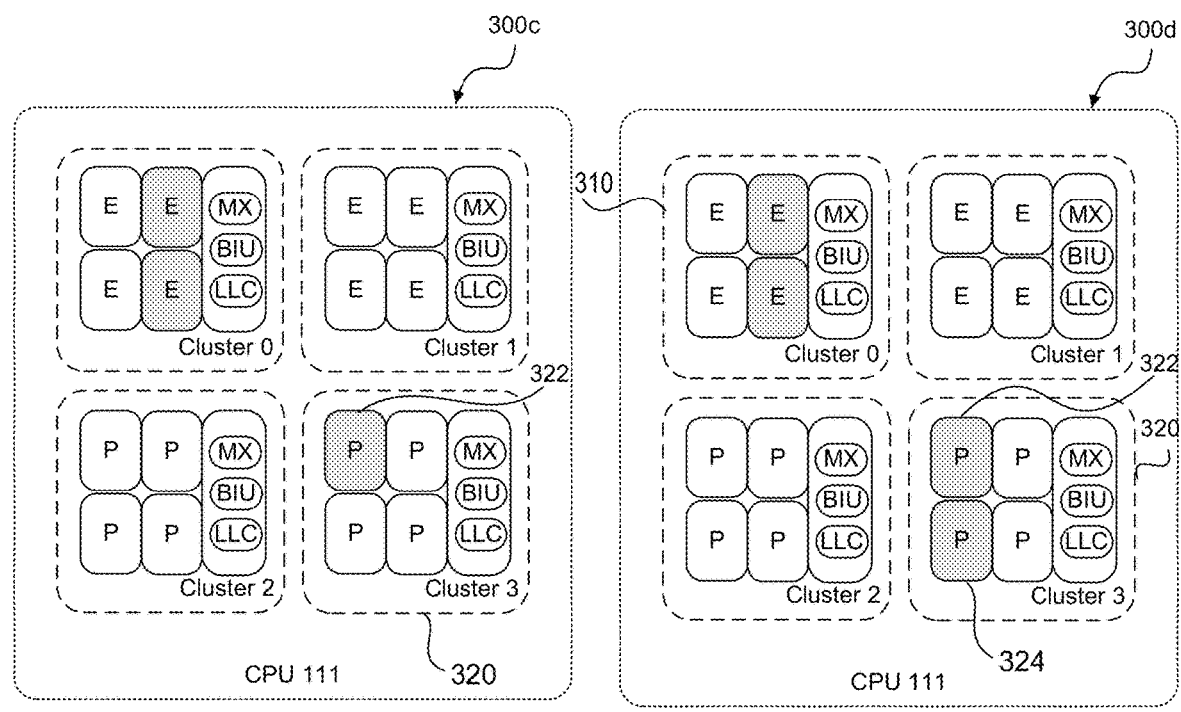

FIG. 3A illustrates examples 300a-300d of thread group placement, according to some embodiments of the disclosure. As a convenience and not a limitation, FIG. 3A may be described with reference to elements from other figures in the disclosure. For example, examples 300a-300d can refer to CPU 111 of FIG. 1 as well as thread groups 1 and 2 of FIGS. 2A and 2B. Examples 300a-300d each include four CPU clusters 0-3. Each CPU cluster includes four CPU cores: 4 E-cores or 4 P-cores. Each CPU cluster includes uncore blocks that are separate from the CPU cores. Examples of uncore blocks include shared CPU cluster resources such as a matrix extension (MX) engine, a bus interface unit (BIU), and a last level cache (LLC). The CPU cores in a CPU cluster utilize the shared resources. Performance controller 124 can record and maintain historical overload metrics for the shared resources of a cluster (e.g., past shared resource overloaded metrics.) In some embodiments a shared resource overload flag can be implemented for each shared resource of a CPU cluster, and can include for example, an MX overload flag, a BIU overload flag, and an LLC overload flag. An overload flag can be a single bit. For example, performance controller 124 can record whether a shared resource for a CPU cluster was overloaded (e.g., MX, BIU, and/or LLC.) The recording of a shared resource overloaded can be a Boolean value (1/0).

An MX engine is a shared CPU cluster resource that can be a coprocessor that supports accelerated integer and floating-point single instruction, multiple data (SIMD) arithmetic. A load-store unit (LSU) includes a set of execution pipelines within a CPU core that performs loads, stores, atomics and other operations related to the movement of data. If multiple CPU cores transmit instructions (e.g., LSU micro-operations (μops)) to a common MX engine, the MX engine can become a performance bottleneck. An LLC is a shared CPU cluster resource that is a level of memory hierarchy common to the CPU cores in a CPU cluster. In some embodiments, LLC can be a L2 cache. BIU is a shared CPU cluster resource that can link the LLC with the memory topology outside of the CPU cluster to a bus or fabric (not shown). When a CPU core load or store access miss in the LLC, a request is sent through the BIU to resolve the miss from some other location in the topology, such as a system cache or main memory (e.g., memory 114.) In particular, there is a request queue in the BIU containing requests from the LLC to other memory agents that will be transmitted over the bus or fabric. When the request queue of the BIU becomes full, the requests can be delayed, which impairs the performance of resolving LLC misses. If the volume of such load or store access misses is sufficiently large—for example, when multiple CPU cores are accessing the LLC at high rates—the BIU can become a performance bottleneck. In some embodiments the LLC can also become a performance bottleneck.

Thread groups working toward a common purpose may prefer similar machine performance. Thus, scheduler 122 can guide threads toward a preferred CPU cluster. For example, assume that thread group 1 of FIG. 2A prefers to run on CPU cluster 0 310 and thread group 2 of FIG. 2A prefers to run on CPU cluster 3 320. Example 300a illustrates a first thread from thread group 1 becoming runnable and is placed (e.g., guided by scheduler 122) on CPU cluster 0 310 at E-core 312. Example 300b illustrates a second thread from thread group 1 becoming runnable and is placed on CPU cluster 0 310 at E-core 314. Additional threads from thread group 1 can be placed on E-core 312, E-core 314, or another E-core on CPU cluster 0. Example 300c illustrates a thread from thread group 2 becoming runnable and is placed on CPU cluster 3 320 at P-core 322. Example 300d illustrates a second thread from thread group 2 becoming runnable and is placed on CPU cluster 3 320 at P-core 324. Additional threads from thread group 2 can be placed on P-core 322, P-core 324, or another P-core on CPU cluster 3.

In some embodiments, performance controller 124 moves beyond analysis of higher layer concepts to utilize data from performance counters monitoring hardware to give guidance to scheduler 122 to determine which individual threads of a thread group should be or need to be moved. The guidance may be because the individual threads of a thread group at execution may contribute to the overloading of shared resources within a CPU cluster. Some embodiments utilize low level micro architectural information like performance monitoring at a CPU core level within a CPU cluster of CPU 111 to help the performance controller 124 make more focused decisions on how the work should execute. Based on this analysis, performance controller 124 can make individual thread group recommendations to scheduler 122.

Figure 3B:
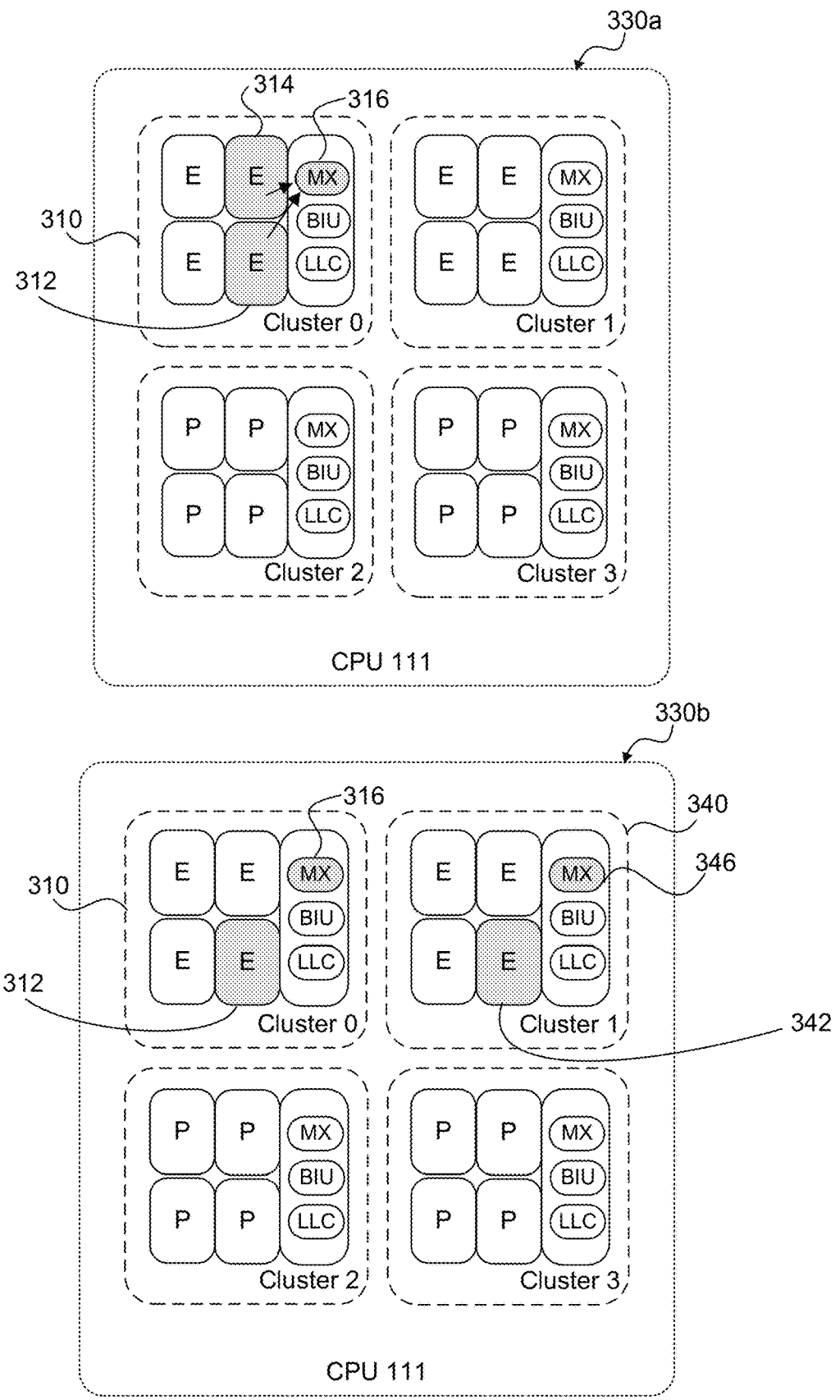
FIG. 3B illustrates examples for moving an individual thread(s) for CPU cluster shared resource management, according to some embodiments of the disclosure.

FIG. 3B illustrates examples 330a and 330b for moving an individual thread for CPU cluster shared resource management, according to some embodiments of the disclosure.

As a convenience and not a limitation, FIG. 3B may be described with reference to elements from other figures in the disclosure. For example, examples 330a and 330b can refer to CPU 111 of FIG. 1, thread groups 1 and 2 of FIGS. 2A and 2B, and thread groups 1 and 2 of FIGS. 4A and 4B. Example 330a illustrates MX 316 being oversubscribed (e.g., overloaded.)

In some embodiments, scheduler 122 can collect performance measurements via performance counters to detect the threads (e.g., threads of thread group 1) that are causing the overload of MX 316 in CPU cluster 0 as shown in example 330a. In example 330a, the performance of overloaded MX 316 can be about 16 watts, and the frequency of MX 316 can be about 2.9 GHz. Scheduler 122 can distribute one or more threads running on E-core 314 across more CPU clusters to increase the throughput of MX 316 and thus the power (e.g., performance) of MX 316 for the corresponding work load. As shown in example 330b, one or more individual threads of thread group 1 running on E-core 314 can subsequently be distributed to E-core 342 of CPU cluster 1 340 that utilizes MX 346. Subsequent to the distribution of the one or more individual threads that have utilized MX functions in the past from CPU cluster 0 to CPU cluster 1, performance of MX 316 can almost double in wattage and the frequency can increase significantly (e.g., the frequency can be more than doubled). In other words, the bottleneck of MX 316 has been avoided.

Example 330a illustrates MX 316 being overloaded or oversubscribed. The overload can occur when there is more work to be performed in an MX clock cycle than an MX is able to consume. For example, one or more threads of thread group 1 running on E-core 312 can cause E-core 312 create MX context and issue MX instructions (e.g., LSU μops) to MX 316. In addition, one or more threads of thread group 1 running on E-core 312 can cause E-core 314 to create MX context and issue MX instructions to MX 316. MX 316 can become overloaded. Performance controller 124 can collect and record that CPU cluster 0 experienced an MX overload condition with MX 316. For example, during a periodic sampling interval, performance controller 124 can determine how many CPU cores have MX 316 contexts that are available and active. If the number of active MX 316 contexts per MX 316 clock cycle is greater than a test threshold value (e.g., 100%), then MX 316 is oversubscribed and has more work (e.g., MX contexts) than MX 316 is able to consume. Thus, MX 316 is determined to be overloaded and performance controller 124 can set an MX overload flag for CPU cluster 0.

Performance controller 124 can maintain and store state information for CPU cores and CPU clusters of CPU 111, including shared resource overloads per CPU cluster. For example, during a sampling interval, core and uncore performance counters of a CPU cluster can be sampled and corresponding metrics can be calculated. For example, a MX contention metric can be calculated over a sample duration. In some embodiments, performance controller 124 records a Boolean value (0/1) indicating whether a shared resource overload flag per cluster experienced an overloaded. Based on example 330a, performance controller 124 can record '1' for MX overload flag for CPU cluster 0 based on MX 316. Other shared resource overload flags on CPU cluster 0 (e.g., BIU and LLC) can remain at '0' since they did not satisfy a corresponding threshold test value. The Boolean values representing shared resource overloads are historical metrics that remain even after a thread has gone off core. In some embodiments, CPU cluster overload flags for shared resources are not synchronized across CPU cores of a CPU cluster.

In some embodiments, performance controller 124 can provide guidance to scheduler 122 with regard to whether certain individual threads of a thread group should be moved to a different CPU cluster to increase performance and/or throughput. The guidance can be based first on the historical CPU cluster metrics regarding shared resource overloads. If historical CPU cluster metrics such as shared resource overload flags are set, then filtered on-core metrics from one or more present threads of a thread group on-core may be collected and analyzed. If for example, no shared resource overload flags are set for any CPU clusters, then performance controller would not check filtered on-core metrics corresponding to present threads.

A sampling interval described above can occur every few milliseconds (e.g., 2 msec, 5 msec.) In some embodiments, scheduler 122 can issue a callout function to performance controller 124 on the order of tens of microseconds (e.g., 10 μsec, 15 μsec.) During a callout, performance controller 124 checks historical metrics for each CPU cluster 0-3 to see if a shared resource overload flag has been set. Based on example 330a, a MX overload flag for CPU cluster 0 is set to '1'. Since a shared resource overload flag for CPU cluster 0 has been set, performance controller 124 then checks present on-core metrics in CPU cluster 0 to determine which current threads are causing E-cores (e.g., E-cores 312 and 314) in CPU cluster 0 to issue MX instructions to MX 316, since MX 316 corresponds to the historical shared resource overload flag for CPU cluster 0. Assuming in this example that the present on-core metrics indicate that thread 1.C of thread group 1 on E-core 314 is utilizing MX 316, performance controller 124 can indicate to scheduler 122 that thread 1.C is issuing MX instructions to MX 316.

Figure 4A:
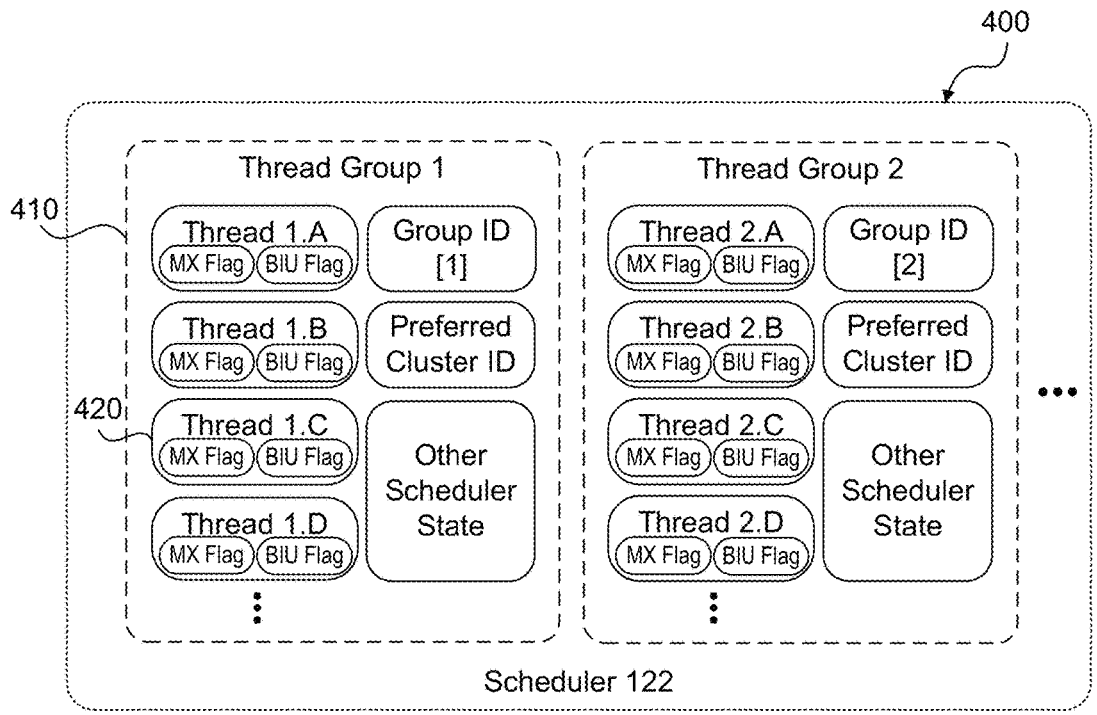
FIGS. 4A and 4B illustrate examples for setting a thread flag for CPU cluster shared resource management, according to some embodiments of the disclosure.
Figure 4B:
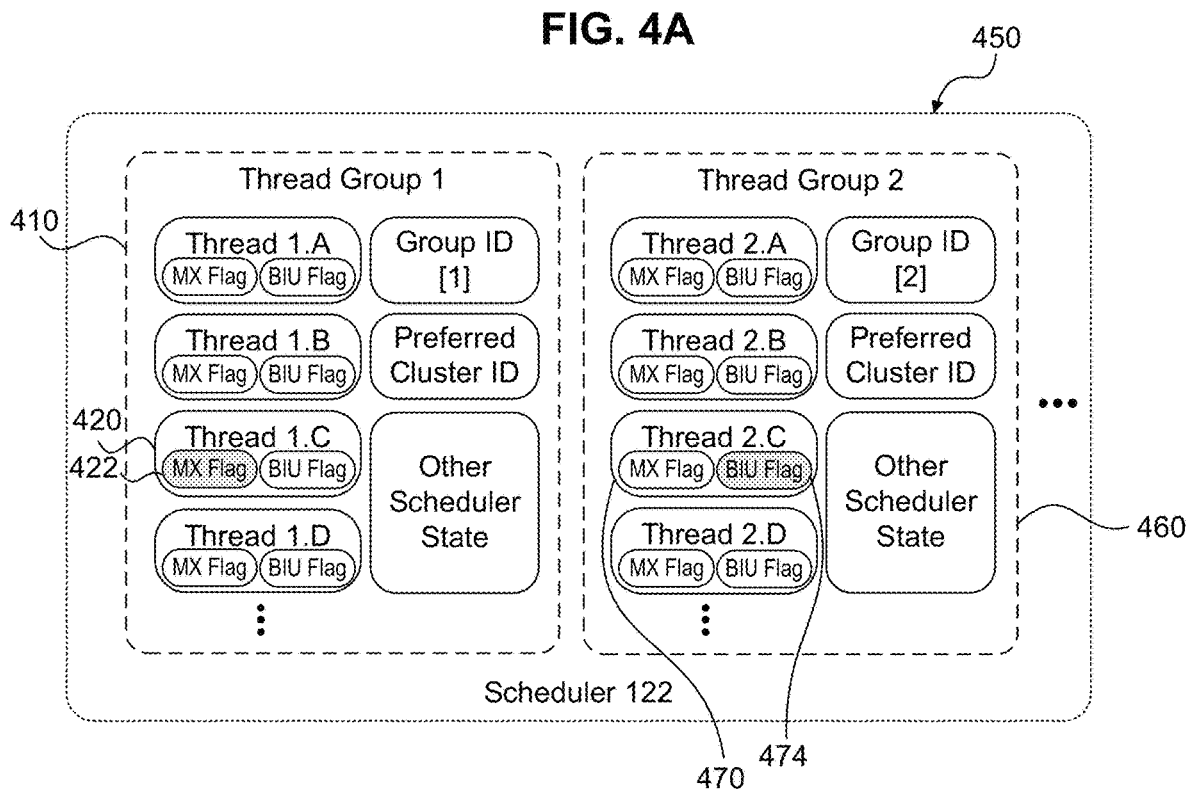

FIGS. 4A and 4B illustrate examples 400 and 450 for setting a thread flag for CPU cluster shared resource management, according to some embodiments of the disclosure. As a convenience and not a limitation, FIGS. 4A-4B may be described with reference to elements from other figures in the disclosure. For example, examples 400 and 450 can refer to scheduler 122 of FIG. 1. Examples 400 and 450 include thread group 1 410 and thread group 2 and individual threads like thread 1.C 420. In these examples, the individual threads also include thread flags: MX flag and BIU flag. Performance controller 124 can transmit a message to scheduler 122 after a callout function to indicate that one or more individual threads are utilizing a shared resource (e.g., MX 316) that may contribute to a future overload of a shared resource including but not limited to MX, BIU, and LLC.

Continuing the discussion of FIG. 3B and example 330a, performance controller 124 can transmit a message to scheduler 122 indicating that thread 1.C in the past has caused a CPU core to issue MX instructions. Performance controller's determination that thread 1.C may utilize MX resources in the future is based on historical CPU cluster 0 MX overload flag being set, and on-core metrics when thread 1.C was on E-core 314 of CPU cluster 0 310. Performance controller 124 can pass information regarding individual thread 1.C and/or one more individual threads of thread group 1 410 to scheduler 122. The message can indicate for example, Thread 1.C→MX [true]. Example 450 illustrates that after scheduler 122 receives the message, scheduler 122 can set a thread flag, MX flag 422 of thread 1.C 420 of thread group 1 410. Setting a thread flag can include setting one or more bits (e.g. setting a bit to '1') for example.

A thread flag (e.g., MX flag 422) follows thread 1.C even when thread 1.C is moved from one CPU core to another, or from one CPU cluster to a different CPU cluster. Scheduler 122 can use the thread flags to consider alternate scheduling policies such as CPU cluster anti-affinity scheduling, where one or more threads of a thread group appear to repel each other. For example, scheduling a thread like thread 1.C to run on CPU cluster 1 away from one or more remaining threads of thread group 1 running on CPU cluster 0 may result in better performance and throughput than when all of the threads of thread group 1 are scheduled on CPU cluster 0.

Scheduler may consider the thread flags at different times: at context switching (e.g., when a change from one thread to another thread on the same CPU core occurs); or at thread state update (e.g., at quantum expiry.) The thread flags are retrospective on what the thread was just doing. Thus, MX flag 422 indicates that based on historical CPU cluster data and recent on-core metrics, thread 1.C has utilized MX resources. Thus, at context switching or at quantum expiry, example 330b of FIG. 3B illustrates that scheduler 122 may use the retrospective thread flag information to schedule thread 1.C to run on a different CPU core on a different CPU cluster (e.g., E-core 342 on CPU cluster 1 340.) Thread 1.C now utilizes MX 346 while one or more remaining threads of thread group 1 may continue to execute on E-core 312 of cluster 0 310. Thus, by enabling individual threads (as opposed to entire thread groups) to be scheduled to run on different CPU clusters, scheduler 122 can increase access to shared resources (MX, BIU, and/or LLC.) In some embodiments, a thread flag (e.g., MX flag 422 can remain set until performance controller 124 transmits a signal to scheduler 122 to reset MX flag 422.) In some embodiments other types of thread flags (not shown) can be included such as an LLC flag.

Figure 3C:
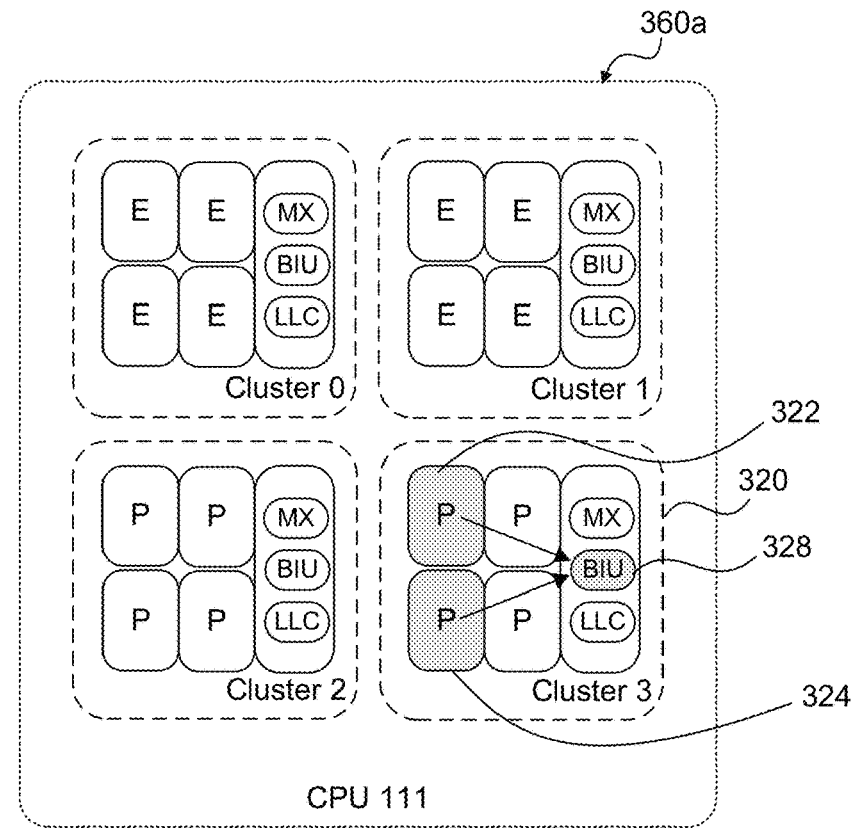
FIG. 3C illustrates other examples for moving an individual thread(s) for CPU cluster shared resource management, according to some embodiments of the disclosure.
Figure 3C:
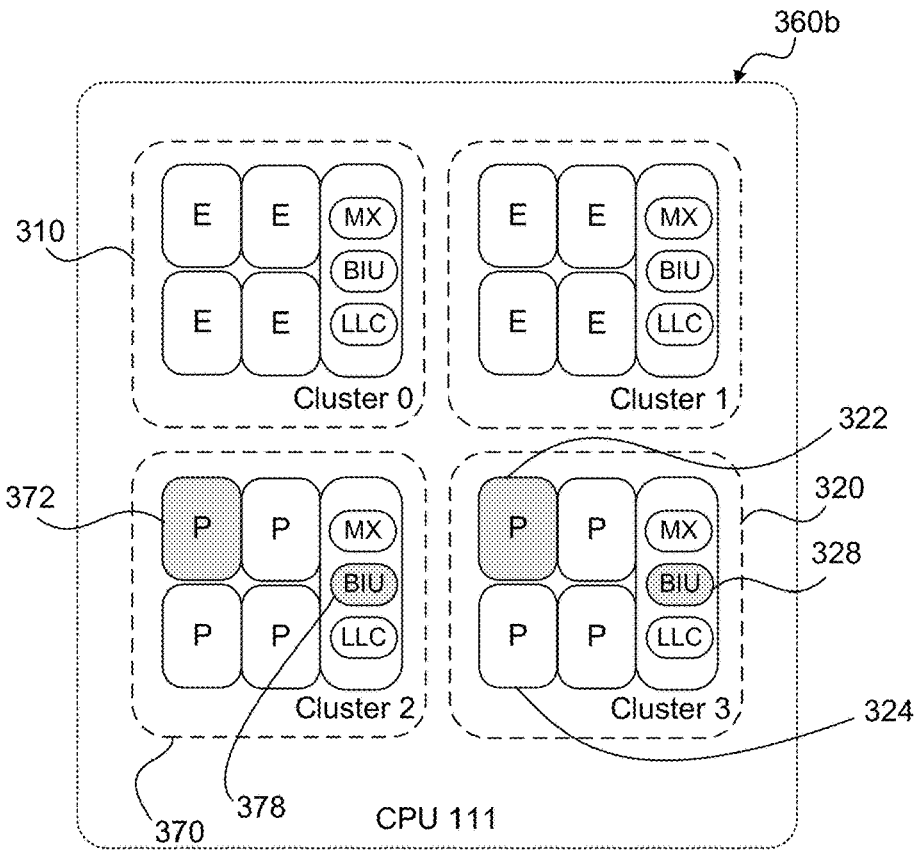

FIG. 3C illustrates examples 360a and 360b for moving an individual thread(s) for CPU cluster shared resource management, according to some embodiments of the disclosure. As a convenience and not a limitation, FIG. 3C may be described with reference to elements from other figures in the disclosure. For example, examples 360a and 360b can refer to CPU 111 of FIG. 1 and thread groups 1 and 2 of FIGS. 4A and 4B. Example 360a illustrates BIU 328 being oversubscribed (e.g., overloaded.)

As mentioned above, a BIU is a resource shared by CPU cores on a CPU cluster. Each BIU includes a BIU request queue that is monitored by counters to determine if there are too many requests (e.g., saturation) for a BIU that are creating a bottle neck. When there is saturation at the BIU, performance controller 124 may check for load miss problems such as a load miss ratio in an LLC. If a CPU core running a thread wants data from an address, the CPU core may try to load the value, but the value may not be present in an LLC (e.g., the value hasn't been used recently). Subsequently, CPU core can make a request for the cache line via the BIU, and the CPU core stalls—waiting for the data (e.g., from memory 114 of FIG. 1.)

In some embodiments, scheduler 122 can collect historical performance measurements via performance counters to determine that BIU 328 in CPU cluster 3 is overloaded as shown in example 360a. In example 360a, the output of overloaded BIU 328 can be about 107 GB/s. Scheduler 122 can distribute one or more threads running on P-core 324 across more CPU clusters to increase the output of BIU 328 for the corresponding work load. As shown in example 360b, one or more individual threads of thread group 2 running on P-core 324 can subsequently be distributed to P-core 372 of CPU cluster 2 370 that utilizes BIU 378. Subsequent to the distribution of the one or more individual threads to CPU cluster 12, output of BIU 328 can increase to 195 GB/s (almost doubled.) In other words, the bottleneck of BIU 328 has been avoided.

For example, during a periodic sampling interval, performance controller 124 can determine how saturated a BIU resource is per CPU cluster. For example, performance controller can determine how many CPU cores have made transmitted a request to a BIU request queue to see whether a BIU shared resource (e.g., BIU 328 of cluster 3 320) is overloaded. In some embodiments, a ratio of two performance counts are calculated. The numerator is the count of BIU cycles in which the BIU request queue (containing outgoing requests from the LLC to the fabric) is full, and the denominator is the count of total BIU cycles. This ratio can be filtered for hysteresis using a low-pass filter, the output of which is compared against a tunable threshold. When this threshold test passes (e.g., exceeds the tunable threshold), the CPU cluster's BIU is marked as saturated. Thus, BIU 328 can be determined to be overloaded and performance controller 124 can set a CPU cluster 3 BIU overload flag.

In some embodiments, performance controller 124 can provide guidance to scheduler 122 with regard to whether certain individual threads of a thread group should be moved to a different CPU cluster to increase output. The guidance can first be based on the historical CPU cluster metrics regarding shared resource overloads. If during a callout function for example, performance controller 124 determines that a BIU overload flag is set for a CPU cluster, then performance controller 124 can check filtered on-core metrics from one or more present threads of a thread group on-core to see which may be utilizing a shared resource corresponding to a historical BIU overload flag. Based on example 360a, during a callout, performance controller 124 checks historical metrics for each CPU cluster 0-3 to see if a shared resource overload flag has been set. Since a BIU overload flag for CPU cluster 3 is set to '1' due to BIU 328 being overloaded, performance controller 124 then checks present on-core metrics in CPU cluster 3 to determine which current threads are causing P-cores (e.g., P-cores 322 and 324) in CPU cluster 3 to issue requests to BIU 328. Assuming in this example that the present on-core metrics indicate that thread 2.C of thread group 2 on P-core 324 is sending requests to BIU 328, performance controller 124 can indicate to scheduler 122 that thread 2.C 470 of example 450 of FIG. 4B may send requests in the future to a BIU. In other words, thread 2.C 470 has issued requests to BIU 328 in the past and may also in the future. Performance controller 124 can pass information regarding individual thread 2.C or one or more individual threads of thread group 2 460 to scheduler 122. The message can indicate for example, Thread 2.C→BIU [true]. Example 450 illustrates that after scheduler 122 receives the message, scheduler 122 can set a thread flag, BIU flag 474 of thread 2.C 470 of thread group 2 460. Setting a thread flag can include setting one or more bits (e.g. setting a bit to '1') for example.

Thread flag, BIU flag 474 follows thread 2.C even when thread 2.C is moved from one CPU core to another, or from one CPU cluster to a different CPU cluster. Scheduler 122 can use the thread flags to consider alternate scheduling policies such as CPU cluster anti-affinity scheduling, where one or more threads of a thread group appear to repel each other. For example, scheduling a thread like thread 2.C to run on CPU cluster 2 away from one or more remaining threads of thread group 2 running on CPU cluster 3 may result in better output than when all of the threads of thread group 2 are scheduled on CPU cluster 3.

Scheduler may consider the thread flags at different times: at context switching (e.g., when a change from one thread to another thread on the same CPU core occurs); or at thread state update (e.g., at quantum expiry.) The thread flags are retrospective on what the thread was just doing. Thus, BIU flag 474 indicates that based on historical CPU cluster data and recent on-core metrics, thread 2.C has utilized BIU resources. Thus, at context switching or at quantum expiry, example 360b of FIG. 3C illustrates that scheduler 122 may use the retrospective thread flag information to schedule thread 2.C to run on a different CPU core on a different CPU cluster (e.g., P-core 372 on CPU cluster 2 370.) Thread 2.C now utilizes BIU 378 while one or more remaining threads of thread group 2 may continue to execute on P-core 322 of cluster 3 320. Thus, by enabling individual threads (as opposed to entire thread groups) to be scheduled to run on different CPU clusters, scheduler 122 can increase access to shared resources (MX, BIU, and/or LLC.) In some embodiments, threads of thread group 2 may prefer to remain on CPU clusters with P-cores until the P-cores are full before being transferred to CPU clusters with E-cores, and scheduler 122 assigns the schedules accordingly. In some embodiments, a thread flag (e.g., BIU flag 474 can remain set until performance controller 124 transmits a signal to scheduler 122 to reset BIU flag 474.) In some embodiments other types of thread flags (not shown) can be included such as an LLC flag.

Figure 5:
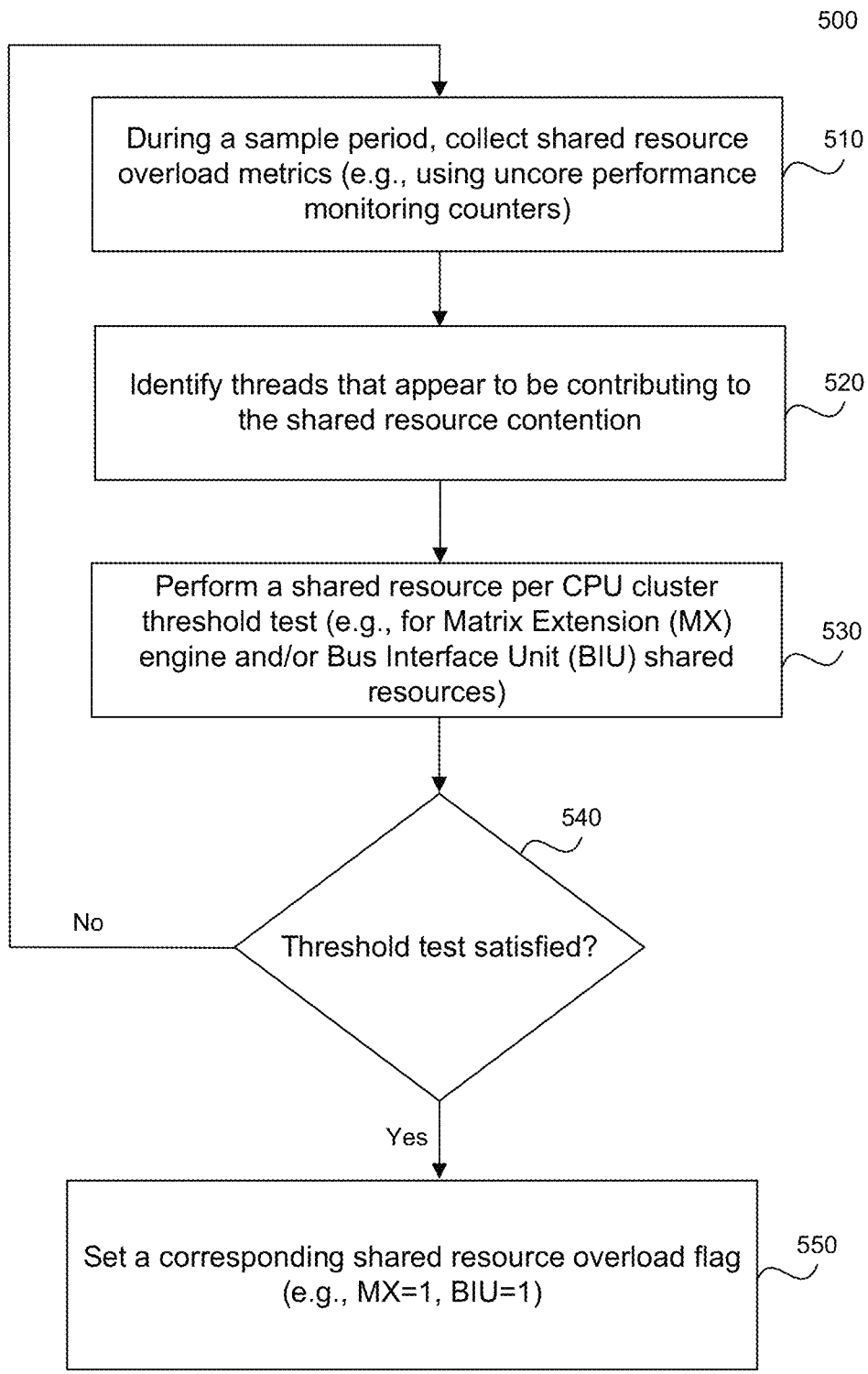
FIG. 5 illustrates an example method for a performance controller determining shared resource usage per cluster for CPU cluster shared resource management, according to some embodiments of the disclosure.

FIG. 5 illustrates example method 500 for a performance controller determining shared resource usage per cluster for CPU cluster shared resource management, according to some embodiments of the disclosure. As a convenience and not a limitation, FIG. 5 may be described with reference to elements from other figures in the disclosure. For example, method 500 may be performed by performance controller 124 of FIG. 1.

At 510, performance controller 124 can collect shared resource overload metrics (e.g., using uncore performance monitoring counters) during a sample interval which may be periodic.

At 520, performance controller 124 can identify threads that appear to be contributing to the shared resource contention (e.g., MX, BIU, and/or LLC) per cluster.

At 530, performance controller 124 can perform a shared resource per CPU cluster threshold test (e.g., for MX, BIU, and/or LLC shared resources.)

At 540, performance controller 124 determines whether a threshold test was satisfied.

The threshold values can be adjustable or tunable. When the threshold test is satisfied, a shared resource can be determined to be overloaded and method 500 proceeds to 550. Otherwise, method 500 returns to 510.

At 550, performance controller 124 can set a corresponding shared resource overload flag (e.g., MX=1, BIU=1) per CPU cluster.

Figure 6:
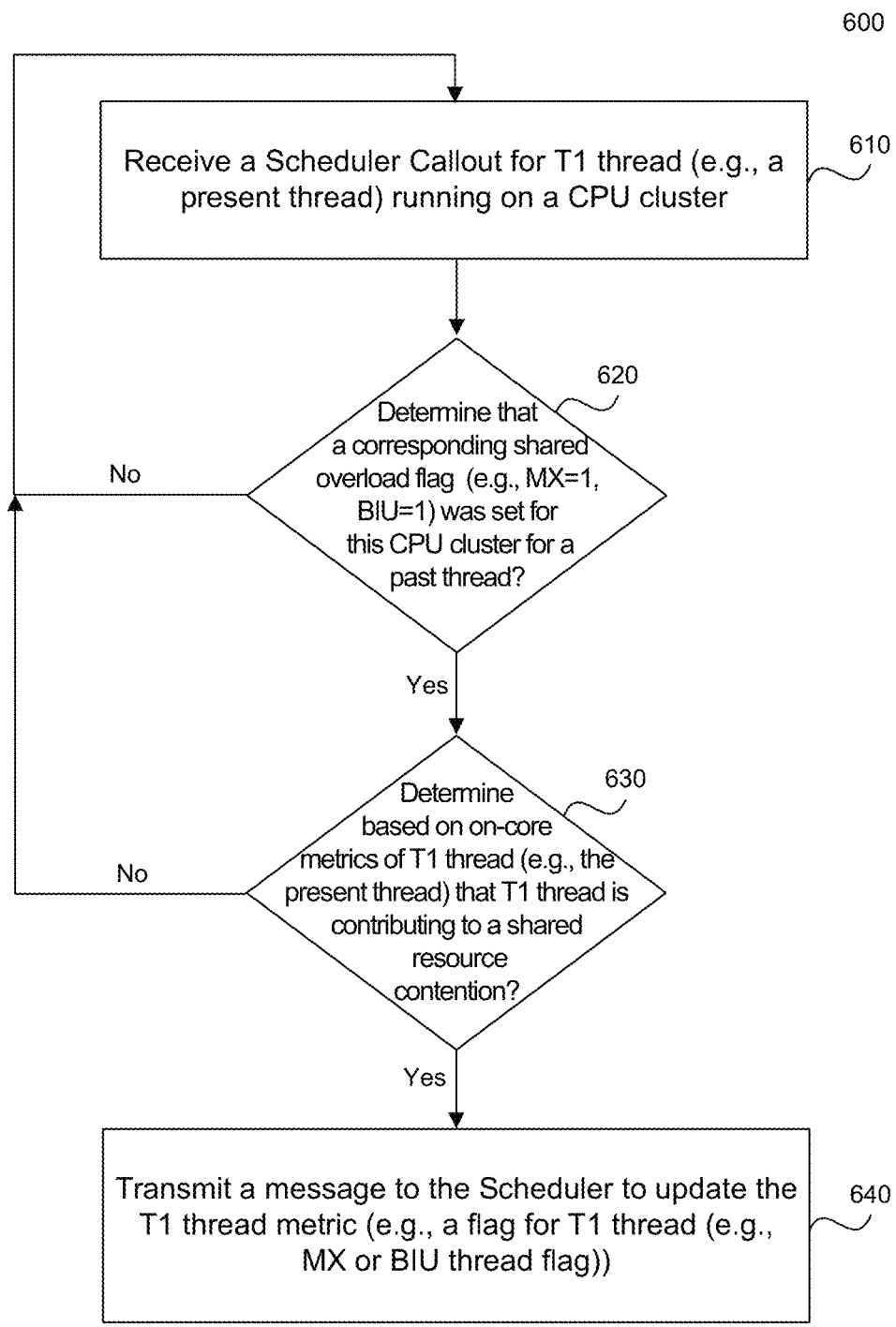
FIG. 6 illustrates an example method for a performance controller determining a thread flag setting for CPU cluster shared resource management, according to some embodiments of the disclosure.

FIG. 6 illustrates example method 600 for a performance controller determining a thread flag setting for CPU cluster shared resource management, according to some embodiments of the disclosure. As a convenience and not a limitation, FIG. 6 may be described with reference to elements from other figures in the disclosure. For example, method 600 may be performed by performance controller 124 of FIG. 1.

At 610, performance controller 124 can receive a Scheduler Callout for T1 thread (e.g., a present thread) running on a CPU cluster.

At 620, performance controller 124 can determine whether a corresponding shared resource overload flag (e.g., MX=1, BIU=1) was set for this CPU cluster for a past thread (e.g., based on historical CPU cluster metrics collected during a sampling interval.) When a shared resource overload flag for the CPU cluster is detected, method 600 proceeds to 630. Otherwise, if no shared resource overload flags are set for the CPU cluster, performance controller 124 does not need to check any further metrics, and method 600 returns to 610.

At 630, performance controller 124 can determine based on on-core metrics of T1 thread (e.g., the present thread) that T1 thread is contributing to a shared resource contention. When performance controller 124 determines that T1 thread is contributing to the shared resource contention, method 600 proceeds to 640. Otherwise, method 600 returns to 610.

At 640, performance controller 124 can transmit a message to scheduler 122 to update a T1 thread metric. For example, the message can indicate to scheduler 122 to set a thread flag for T1 thread (e.g., MX thread flag, BIU thread flag, or LLC thread flag.)

Figure 7:
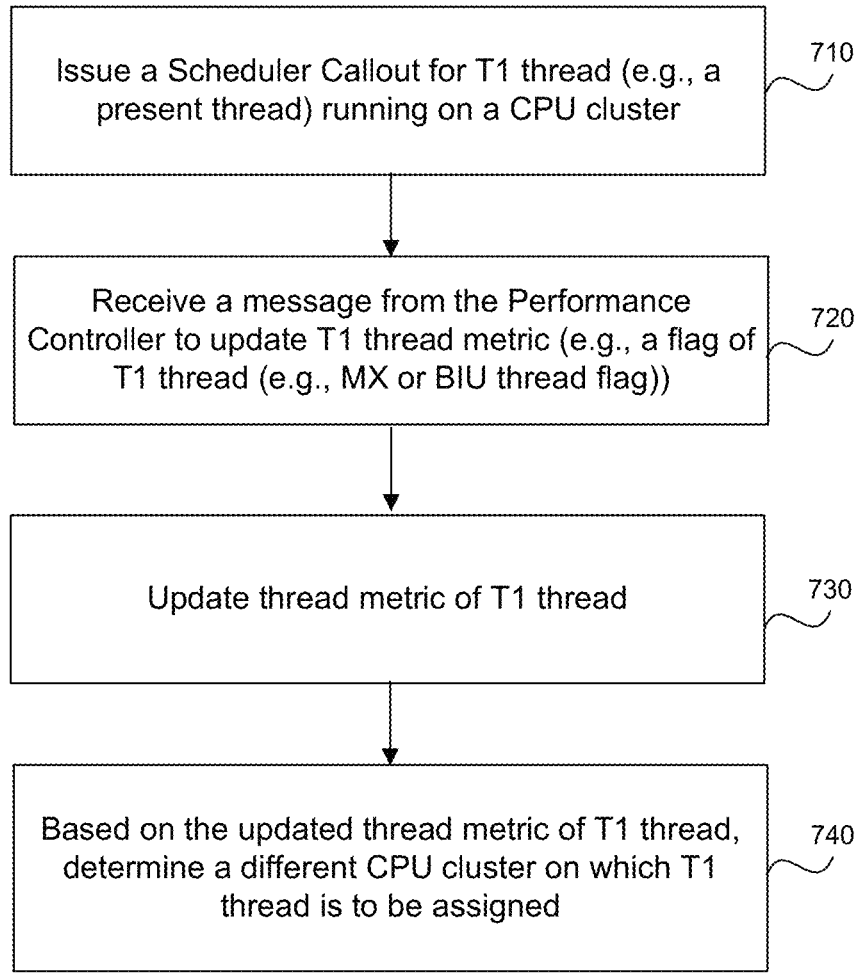
FIG. 7 illustrates an example method for a scheduler determining movement of an individual thread(s) for CPU cluster shared resource management, according to some embodiments of the disclosure.

FIG. 7 illustrates example 700 method for a scheduler determining movement of an individual thread(s) for CPU cluster shared resource management, according to some embodiments of the disclosure. As a convenience and not a limitation, FIG. 7 may be described with reference to elements from other figures in the disclosure. For example, method 700 may be performed by scheduler 122 of FIG. 1.

At 710, scheduler 122 can issue a Scheduler Callout for T1 thread (e.g., a present thread) running on a CPU cluster.

At 720, scheduler 122 can receive a message from performance controller 124 to update a T1 thread metric (e.g., a flag of T1 thread (e.g., MX, BIU, and/or LLC thread flag.)

At 730, scheduler 122 can update thread metric (e.g., a thread flag) corresponding to a shared resource of the CPU cluster (e.g., MX, BIU, and/or LLC thread flag) of T1 thread.

At 740, based on the updated thread metric of T1 thread, scheduler 122 can determine a different CPU cluster on which T1 thread is to be assigned to remove bottle necks, improve throughput, and/or performance.

Figure 8:
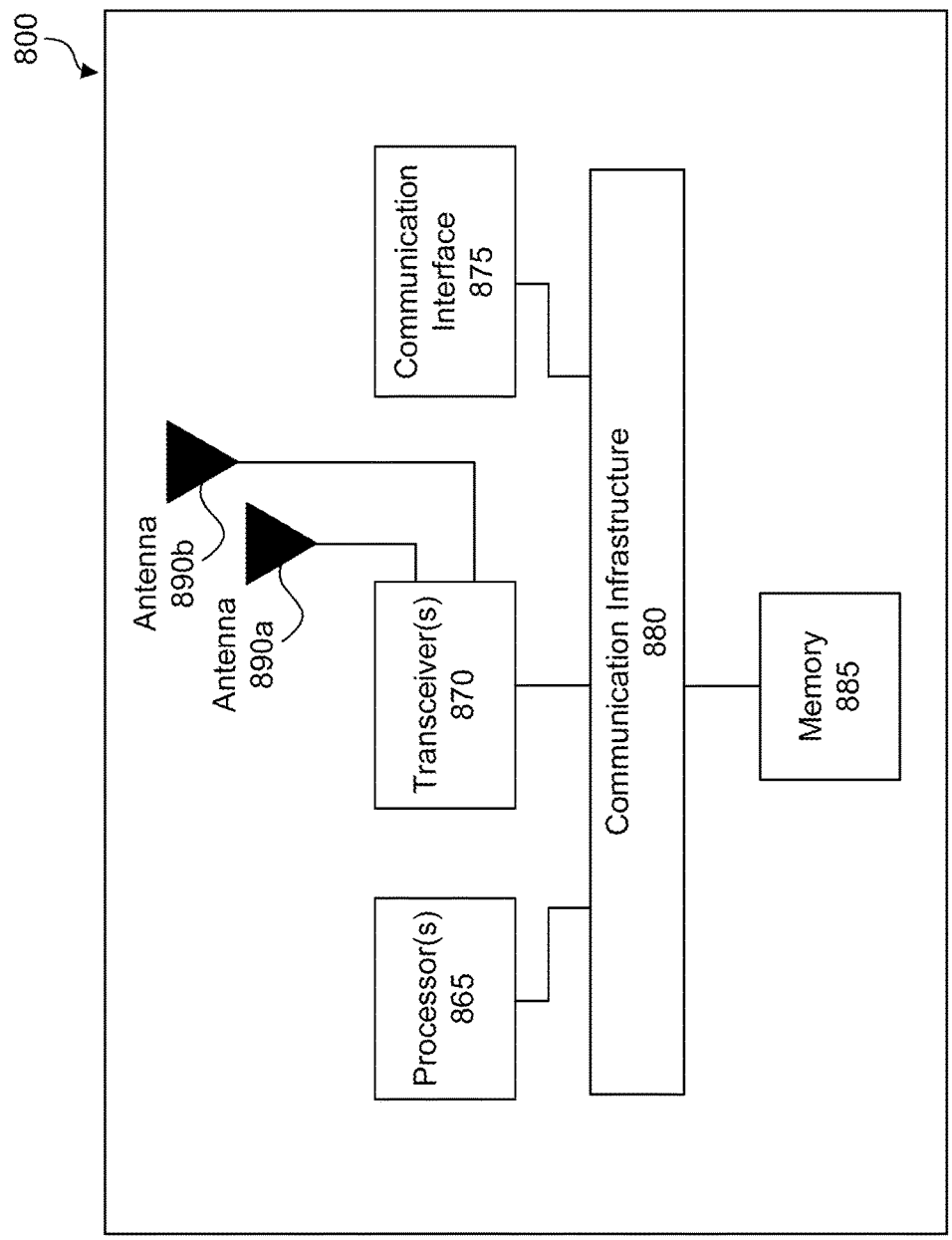
FIG. 8 illustrates a block diagram of an example wireless system operating with CPU cluster shared resource management, according to some embodiments of the disclosure.

FIG. 8 illustrates a block diagram of example wireless system 800 operating with CPU cluster shared resource management, according to some embodiments of the disclosure. For explanation purposes and not a limitation, FIG. 8 may be described with reference to elements from FIG. 1. For example, system 800 may perform the functions of system 100 of FIG. 1; devices performing functions described in: Examples 200 and 250 of FIG. 2, examples of FIG. 3A, FIG. 3B, and FIG. 3C, examples of FIG. 4A and FIG. 4B; and devices performing functions of method 500 of FIG. 5, method 600 of FIG. 6, method 700 of FIG. 7.

System 800 includes one or more processors 865, transceiver(s) 870, communication interface 875, communication infrastructure 880, memory 885, and antenna 890. Memory 885 may include random access memory (RAM) and/or cache, and may include control logic (e.g., computer instructions) and/or data. One or more processors 865 can execute the instructions stored in memory 885 to perform operations enabling wireless system 800 to transmit and receive wireless communications, including the functions for supporting CPU cluster shared resource management described herein. In some embodiments, one or more processors 865 can be "hard coded" to perform the functions herein. Transceiver(s) 870 transmits and receives wireless communications signals including wireless communications supporting CPU cluster shared resource management according to some embodiments, and may be coupled to one or more antennas 890 (e.g., 890*a*, 890*b*). In some embodiments, a transceiver 870*a* (not shown) may be coupled to antenna 890*a* and different transceiver 870*b* (not shown) can be coupled to antenna 890*b*. Communication interface 875 allows system 800 to communicate with other devices that may be wired and/or wireless. Communication infrastructure 880 may be a bus. Antenna 890 may include one or more antennas that may be the same or different types.

Figure 9:
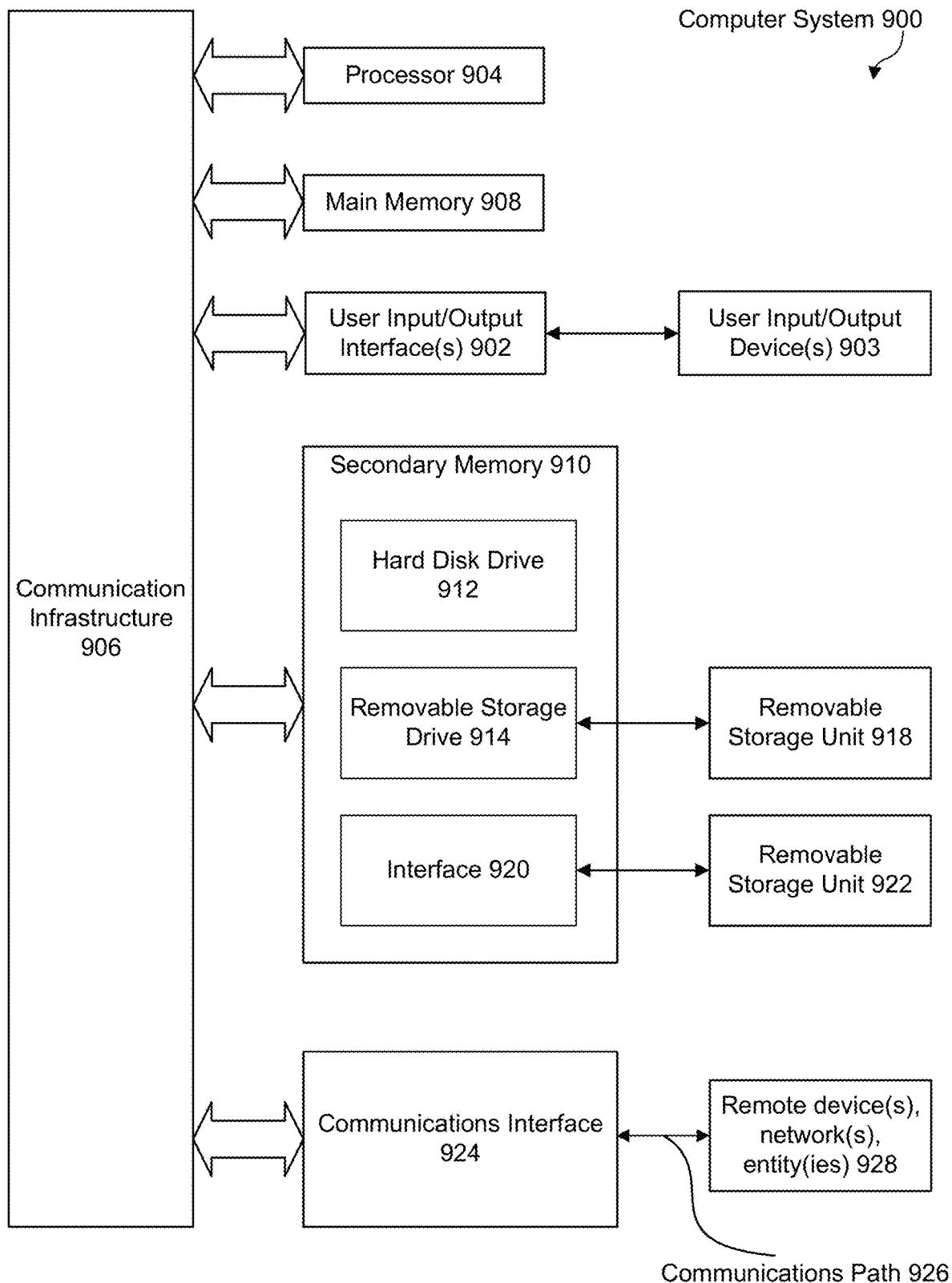
FIG. 9 is an example computer system for implementing some embodiments or portion(s) thereof.

Various embodiments can be implemented, for example, using one or more well-known computer systems, such as computer system 900 shown in FIG. 9. Computer system 900 can be any well-known computer capable of performing the functions described herein. For example, and without limitation, system 100 of FIG. 1; devices performing functions described in: Examples 200 and 250 of FIG. 2, examples of FIG. 3A, FIG. 3B, and FIG. 3C, examples of FIG. 4A and FIG. 4B; and devices performing functions of method 500 of FIG. 5, method 600 of FIG. 6, method 700 of FIG. 7 (and/or other apparatuses and/or components shown in the figures) may be implemented using computer system 900, or portions thereof.

Computer system 900 includes one or more processors (also called central processing units, or CPUs), such as a processor 904. Processor 904 is connected to a communication infrastructure 906 that can be a bus. One or more processors 904 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 900 also includes user input/output device(s) 903, such as monitors, keyboards, pointing devices, etc., that communicate with communication infrastructure 906 through user input/output interface(s) 902. Computer system 900 also includes a main or primary memory 908, such as random access memory (RAM). Main memory 908 may include one or more levels of cache. Main memory 908 has stored therein control logic (e.g., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 includes a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 reads from and/or writes to removable storage unit 918 in a well-known manner.

According to some embodiments, secondary memory 910 may include other means, instrumentalities or other approaches for allowing computer programs and/or other instructions and/or data to be accessed by computer system 900. Such means, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 enables computer system 900 to communicate and interact with any combination of remote devices, remote networks, remote entities, etc. (individually and collectively referenced by reference number 928). For example, communication interface 924 may allow computer system 900 to communicate with remote devices 928 over communications path 926, which may be wired and/or wireless, and which may include any combination of LANs, WANs, the Internet, etc. Control logic and/or data may be transmitted to and from computer system 900 via communication path 926.

The operations in the preceding embodiments can be implemented in a wide variety of configurations and architectures. Therefore, some or all of the operations in the preceding embodiments may be performed in hardware, in software or both. In some embodiments, a tangible, non-transitory apparatus or article of manufacture includes a tangible, non-transitory computer useable or readable medium having control logic (software) stored thereon is also referred to herein as a computer program product or program storage device. This includes, but is not limited to, computer system 900, main memory 908, secondary memory 910 and removable storage units 918 and 922, as well as tangible articles of manufacture embodying any combination of the foregoing. Such control logic, when executed by one or more data processing devices (such as computer system 900), causes such data processing devices to operate as described herein.

Based on the teachings contained in this disclosure, it will be apparent to persons skilled in the relevant art(s) how to make and use embodiments of the disclosure using data processing devices, computer systems and/or computer architectures other than that shown in FIG. 9. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative embodiments may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A method of operating a computing system comprising a first central processing unit (CPU) cluster and a second CPU cluster, wherein the first CPU cluster comprises first CPU cores that can access a first shared resource comprising a Bus Interface Unit (BIU), and the second CPU cluster comprises second CPU cores that can access a second shared resource, the method comprising:
   determining a ratio wherein a numerator comprises: a number of BIU cycles in which a request queue of the BIU is full, and a denominator comprises: a count of total BIU cycles;

filtering the ratio for hysteresis;
comparing an output of the filtering against a tunable threshold;
determining that the BIU is overloaded based at least on the comparison;
determining that a first thread running on a first CPU core of the first CPU cores uses the first shared resource comprising the BIU that has experienced an overload, wherein the overload is based at least on a load-store unit (LSU) micro-operations level metric of the first CPU cluster;
setting a thread flag of the first thread based at least on the determination that the first thread uses the first shared resource that has experienced the overload; and
running the first thread on a second CPU core of the second CPU cores, based at least on the thread flag.

2. The method of claim 1, wherein a second shared resource is a Matrix Extension (MX) engine performing accelerated integer and floating-point single instruction, multiple data (SIMD) arithmetic, and the thread flag of the first thread comprises a BIU thread flag.

3. The method of claim 1, wherein the first thread is part of a thread group, and a second thread of the thread group remains assigned to the first CPU cluster.

4. The method of claim 1, wherein the setting occurs during a callout function, and wherein the LSU micro-operations level metric of the first CPU cluster is measured in a sample interval prior to the callout function.

5. The method of claim 1, further comprising determining the LSU micro-operations level metric of the first CPU cluster, comprising:
assessing during a sample interval, performance counters of the first CPU cluster;
based on the assessing, determining that the first shared resource of the first CPU cluster is overloaded; and
setting an overload flag corresponding to the first shared resource of the first CPU cluster.

6. The method of claim 5, wherein the overload flag comprises a single bit.

7. The method of claim 1, further comprising determining a saturation of the BIU of the first CPU cluster based at least on a load miss ratio in a last level cache (LLC).

8. A non-transitory computer-readable medium storing instructions that, upon execution by a computing system comprising a first central processing unit (CPU) cluster and a second CPU cluster, cause the computing system to perform operations, the operations comprising:
determining a ratio wherein a numerator comprises: a number of Bus Interface Unit (BIU) cycles in which a request queue of the BIU is full, and a denominator comprises: a count of total BIU cycles;
filtering the ratio for hysteresis;
comparing an output of the filtering against a tunable threshold;
determining that the BIU is overloaded based at least on the comparison;
determining that a first thread running on a first CPU core of first CPU cores uses a first shared resource comprising the BIU that has experienced an overload, wherein the overload is based at least on a load-store unit (LSU) micro-operations level metric of the first CPU cluster;
setting a thread flag of the first thread based at least on the determination that the first thread uses the first shared resource that has experienced the overload; and
running the first thread on a second CPU core of the second CPU cores, based at least on the thread flag.

9. The non-transitory computer-readable medium of claim 8, wherein a second shared resource is a Matrix Extension (MX) engine performing accelerated integer and floating-point single instruction, multiple data (SIMD) arithmetic, and the thread flag of the first thread comprises a BIU thread flag.

10. The non-transitory computer-readable medium of claim 8, wherein the first thread is part of a thread group and a second thread of the thread group remains assigned to the first CPU cluster.

11. The non-transitory computer-readable medium of claim 8, wherein the setting occurs during a callout function, and wherein the LSU micro-operations level metric of the first CPU cluster is measured in a sample interval prior to the callout function.

12. The non-transitory computer-readable medium of claim 8, wherein the operations further comprise determining the LSU micro-operations level metric of the first CPU cluster, comprising:
assessing during a sample interval, performance counters of the first CPU cluster;
based on the assessing, determining that the first shared resource of the first CPU cluster is overloaded;
setting an overload flag corresponding to the first shared resource of the first CPU cluster.

13. The non-transitory computer-readable medium of claim 12, wherein the overload flag comprises a single bit.

14. An electronic device comprising:
a memory; and
a performance controller of an asymmetric multiprocessing (AMP) system, coupled to the memory, wherein the AMP system comprising a first central processing unit (CPU) cluster and a second CPU cluster, wherein the first CPU cluster comprises first CPU cores that can access a first shared resource that is a Bus Interface Unit (BIU), and the second CPU cluster comprises second CPU cores that can access a second shared resource, wherein the performance controller is configured to:
determine an overload based on a ratio, wherein a numerator of the ratio comprises a number of BIU cycles in which a request queue of the BIU is full, and a denominator of the ratio comprises a count of total BIU cycles;
filtering the ratio for hysteresis;
comparing an output of the filtering against a tunable threshold;
determining that the BIU is overloaded based at least on the comparison;
determine that a first thread running on a first CPU core of the first CPU cores used the first shared resource comprising the BIU, wherein usage corresponds to a load-store unit (LSU) micro-operations level overload metric that indicates that the first shared resource has experienced the overload;
set a thread flag of the first thread based at least on the determination that the first thread uses the first shared resource that has experienced the overload; and
run the first thread on a second CPU core of the second CPU cores, based at least on the thread flag.

15. The electronic device of claim 14, wherein a second shared resource is a Matrix Extension (MX) engine performing accelerated integer and floating-point single instruction, multiple data (SIMD) arithmetic.

16. The electronic device of claim 14, wherein the first thread is part of a thread group, a second thread of the thread group remains assigned to the first CPU cluster.

17. The electronic device of claim 14, wherein the set occurs during a callout function, and wherein the LSU micro-operations level overload metric of the first CPU cluster is measured in a sample interval prior to the callout function.

18. The electronic device of claim 14, wherein to determine the LSU micro-operations level overload metric of the first CPU cluster, the performance controller is further configured to:
- assess during a sample interval, performance counters of the first CPU cluster;
- based on the assessment, determine that the first shared resource of the first CPU cluster is overloaded; and
- set an overload flag corresponding to the first shared resource of the first CPU cluster, wherein the first shared resource overload flag comprises a single bit.

\* \* \* \* \*